United States Patent [19]

Fünfschilling et al.

[11] Patent Number: 5,686,931
[45] Date of Patent: Nov. 11, 1997

[54] DEVICE FOR DISPLAYING COLORS PRODUCED BY CONTROLLABLE CHOLESTERIC COLOR FILTERS

[75] Inventors: Jürg Fünfschilling, Basel; Martin Schadt, Seltisberg, both of Switzerland; Hubert Seiberle, Rümmlingen, Germany

[73] Assignee: Rolic AG, Basel, Switzerland

[21] Appl. No.: 552,664

[22] Filed: Nov. 3, 1995

[30] Foreign Application Priority Data

Nov. 14, 1994 [CH] Switzerland ............. 3407/94

[51] Int. Cl.$^6$ ............. G02F 1/13; G09G 3/36
[52] U.S. Cl. ............. 345/88; 349/80; 349/97
[58] Field of Search ............. 345/88, 151; 349/5, 349/9, 80, 97, 106, 108, 115, 194

[56] References Cited

U.S. PATENT DOCUMENTS

| | | | |
|---|---|---|---|
| 4,017,156 | 4/1977 | Moriyama et al. | 349/78 |
| 4,416,514 | 11/1983 | Plummer | 349/80 |
| 4,726,663 | 2/1988 | Buzak | 349/80 |
| 4,770,500 | 9/1988 | Kalmanash et al. | 349/80 |
| 4,843,381 | 6/1989 | Baron | 345/88 |
| 4,867,536 | 9/1989 | Pidsosny et al. | 349/97 X |
| 4,968,120 | 11/1990 | Depp et al. | 349/97 |
| 5,032,007 | 7/1991 | Silverstein et al. | 349/79 |
| 5,050,965 | 9/1991 | Conner et al. | 349/80 X |
| 5,235,443 | 8/1993 | Barnik et al. | 349/194 |
| 5,295,009 | 3/1994 | Barnik et al. | 349/115 |
| 5,309,365 | 5/1994 | Sullivan et al. | 364/474.03 |
| 5,315,418 | 5/1994 | Sprague et al. | 349/112 |
| 5,325,218 | 6/1994 | Willett et al. | 349/74 |
| 5,347,378 | 9/1994 | Handschy et al. | 349/78 |
| 5,387,920 | 2/1995 | Bos et al. | 345/88 |

FOREIGN PATENT DOCUMENTS

| | | | |
|---|---|---|---|
| 407 830 | 6/1990 | European Pat. Off. | G02B 5/30 |
| 509 727 | 4/1992 | European Pat. Off. | G09G 3/36 |
| 516 479 | 5/1992 | European Pat. Off. | G02F 1/1335 |
| 600 349 | 11/1993 | European Pat. Off. | G02F 1/1335 |
| 95/34022 | 12/1995 | WIPO | G02F 1/1347 |

OTHER PUBLICATIONS

Fünfschilling, J. and M. Schadt, *Optoelectronics–Devices and Technologies*, vol. 7, No. 2, pp. 263–270 (Dec. 1992).
Schadt, M., *SPIE, Liquid Crystal Devices and Materials*, vol. 1455, pp. 214–224 (Feb. 25–27, 1991).
Hamada, H., et al., *Society for Information Display (SID) Digest*, pp. 269–272 (1992).
Maurer, R., et al., *Society for Information Display (SID) Digest*, pp. 110–113 (1990).
Sato, S., et al., *IEEE Transactions on Electron Devices*, pp. 171–172 (Feb. 1974).
Schadt, M., et al., *Japanese Journal of Applied Physics*, 29(10):1974–1984 (Oct. 1990).

*Primary Examiner*—Raymond J. Bayerl
*Assistant Examiner*—Seth D. Vail
*Attorney, Agent, or Firm*—George W. Johnston; William H. Epstein; John P. Parise

[57] ABSTRACT

Colors are generated in the display device by guiding light through three serially-arranged, electrically controlled color filters. Each filer attenuates one of three colors. The color filters incorporate two cholesteric filters, two λ/4 plates, and one electrically switchable liquid crystal display.

12 Claims, 3 Drawing Sheets

DEVICE FOR DISPLAYING COLORS PRODUCED BY CONTROLLABLE CHOLESTERIC COLOR FILTERS

BACKGROUND OF THE INVENTION

1. Field

The invention relates generally to the field of optic displays, and more particularly to color displays. Specifically, the invention relates to colored displays in which colors are produced by electrically controllable cholesteric color filters connected in series.

2. Description

Prior to the subject invention, three major methods have been used for producing colored liquid crystal displays.

The first and most common method is used primarily for direct vision displays (in contrast to projection systems). This method utilizes a color filter matrix in which each picture dot (each pixel) is divided into three adjacent sub-pixels provided with a red, green or blue filter respectively. A color filter matrix of this kind, based on light absorption, has low light transmitting capacity and requires three times as many controlled pixels as a black and white display having similar resolution.

The second method is applicable only to projection displays. The light from the projection lamp is divided into separate paths of rays for the three primary colors. A liquid crystal display is disposed in each of the three paths of rays. The three paths of rays are subsequently aligned on the screen by suitable optical systems. This second method has about three times the light-transmitting capacity of the first method, since there is no subdivision into subpixels. Moreover, the display needs no higher resolution than a corresponding black and white display. Unfortunately, a major disadvantage of this method is that the non-linear path of the rays require the optical system to be large, heavy, complicated to adjust, and expensive.

In a third, and as yet unpublished method, light from the illuminating lamp is sequentially switched from red to green to blue by electrically switchable filters and the display is supplied synchronously with the picture information correlated with the corresponding color. Regrettably, this arrangement has the disadvantage as in the first method of causing light transmission to be reduced by a factor of 3 (in this case because of the temporal sequence of colors) and the disadvantageous high speed required for the sequential image build-up.

SUMMARY OF THE INVENTION

The present invention combines the advantages of the afore-mentioned methods without sharing their disadvantages. More particularly it relates to a display with an extremely compact linear ray path and high light transmitting capacity, while not requiring increased speed from the liquid crystal cells. Cholesteric liquid crystal filters are used both as color filters and as polarization filters. Thus, the entire arrangement contains no absorbing components greatly adding to its photostability. Cholesteric filters are characterized by great brightness and color purity. The present invention is particularly suitable for projection systems, particularly those mounted on light-room projectors, but can also be used to construct direct vision displays. Another advantage of the invention is that it can be combined with the illumination optical system having high light transmitting capacity described in EP-A-407 830 (corresponding to U.S. Pat. Nos. 5,235,443, 5,295,009, and 5,309,265, the contents of all of which are herein incorporated by reference).

The subject invention provides an electrically controllable color display device having compact linear light guidance. The device comprises three switchable color filters optically connected in series. Each color filter includes two cholesteric filters, two λ/4 plates, and one electrically switchable liquid crystal cell with segmented electrodes. Each color filter is constructed so as to attenuate one of three different colors in response to electrical control.

BRIEF DESCRIPTION OF THE FIGURES

Possible exemplified embodiments of the invention will now be described with reference to the accompanying drawings in which.

DETAILED DESCRIPTION OF THE INVENTION

The subject invention will now be described in terms of its preferred embodiments. These embodiments are set forth to aid in understanding the invention, but are not to be construed as limiting.

Figure 1:
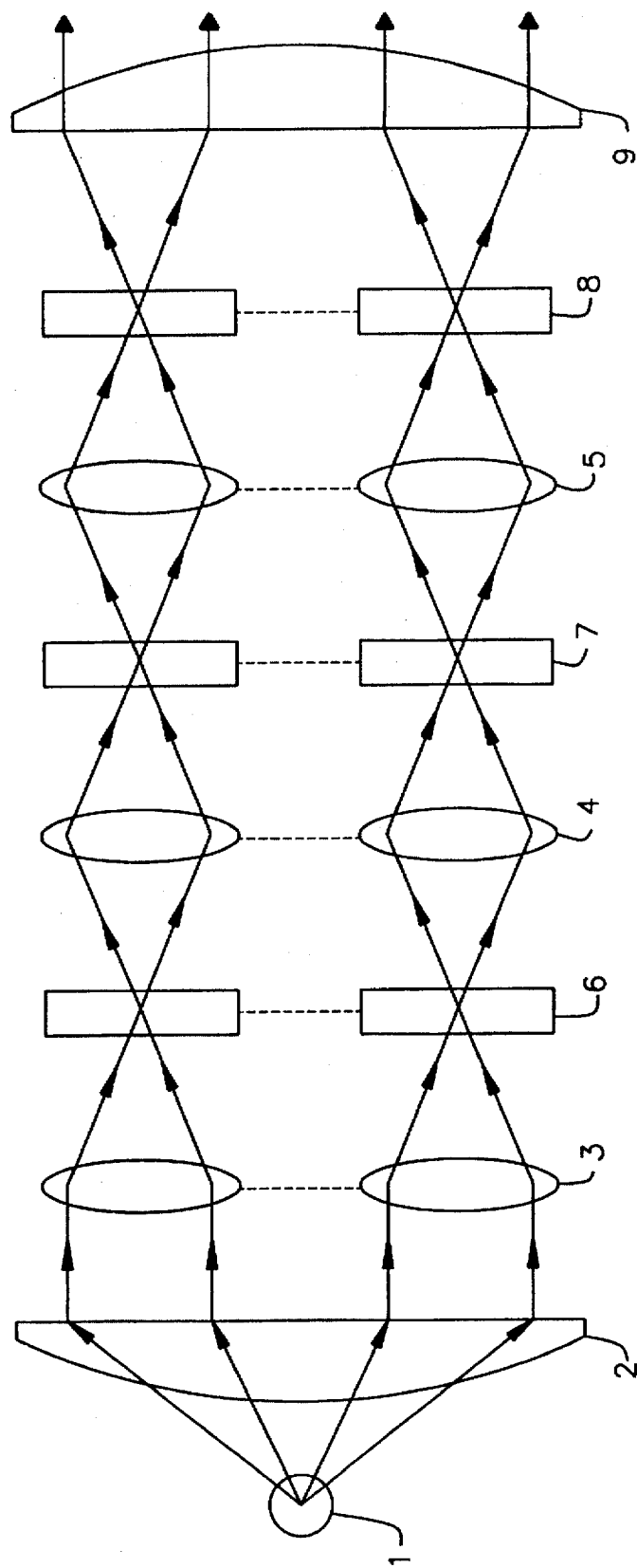
FIG. 1 is a diagram of a projection display system according to the invention.

FIG. 1 shows a projection display system comprising a lamp 1. The light from lamp 1 is projected through a collector lens 2 in a parallel beam on to a matrix 3 of microlenses. A matrix of this kind is described for example by H. Hamada et al., [Society for Information Display (SID) Digest, page 269 (1992)]. The lens matrix focuses the light on to each pixel of a switchable band-block filter (SBBF) 6. The purpose of the SBBF, described in detail hereinafter, is to fade out (or reflect) one of the primary colors red, green or blue to a varying extent for each pixel according to the desired picture information. The remaining light is projected through microlenses 4 on to the next SBBF 7, which fades out the second primary color to a varying extent. The remaining light is again focused by a microlens matrix 5 on to a third SBBF 8, where the third primary color is faded out in accordance with the picture information before being finally projected through the projection lens 9 on to the screen.

The microlenses are for increasing the light efficiency. Holographic scattering patterns, Fresnel lenses or matrix arrangements of graded index lenses can be used as an alternative to microlenses of the kind cited. If the pixels, relative to the spacing between SBBFs, are sufficiently large to prevent any unacceptable parallax error occurring at the desired beam divergence, the microlenses can be omitted. If the path of the rays is conical, such as for example in the case of light-room projectors with Fresnel lenses, the three LCDs can be given slightly different sizes for optimum adaptation to the path of the rays.

Arrangements similar to SBBFs are described in U.S. Pat. No. 4,726,663, the contents of which are herein incorporated by reference. A novel feature of the present invention is color switching for each pixel. This results in a display three times as bright as in a conventional system without imposing any difficult requirements on the speed of the liquid crystal cell.

This advantage of the subject invention can be explained as follows: For example, let the amount of incident light during a picture period be made up of nine parts, three for each color, divided into three sub-periods. The total light available therefore is 3R+3G+3B (if restricted to the available polarization, all methods under discussion lose 50% of the light, since they operate with only one polarization). If bright white is to be shown, according to the invention the three SBBFs 6–8 are operated in their transmission range during the entire period. That is, the transmitted light is (3R+3G+3B). Whereas, in the case of sequential filters the transmission is R in the first period-third, G in the second, and B in the third. That is, sequential filters produce a total of (R+G+B). Such a total is three times smaller than that achieved according to the invention. The case is similar when the pixel is divided into three colored sub-pixels. Bright white means that one-third of each pixel is red, green, and blue respectively (the total signal as before is (R+G+B)). Again, that is three times smaller than according to the subject invention. This also applies if the sub-pixels are formed by cholesteric filters as in the reflective display described in EP-A-600 349.

Figure 2:
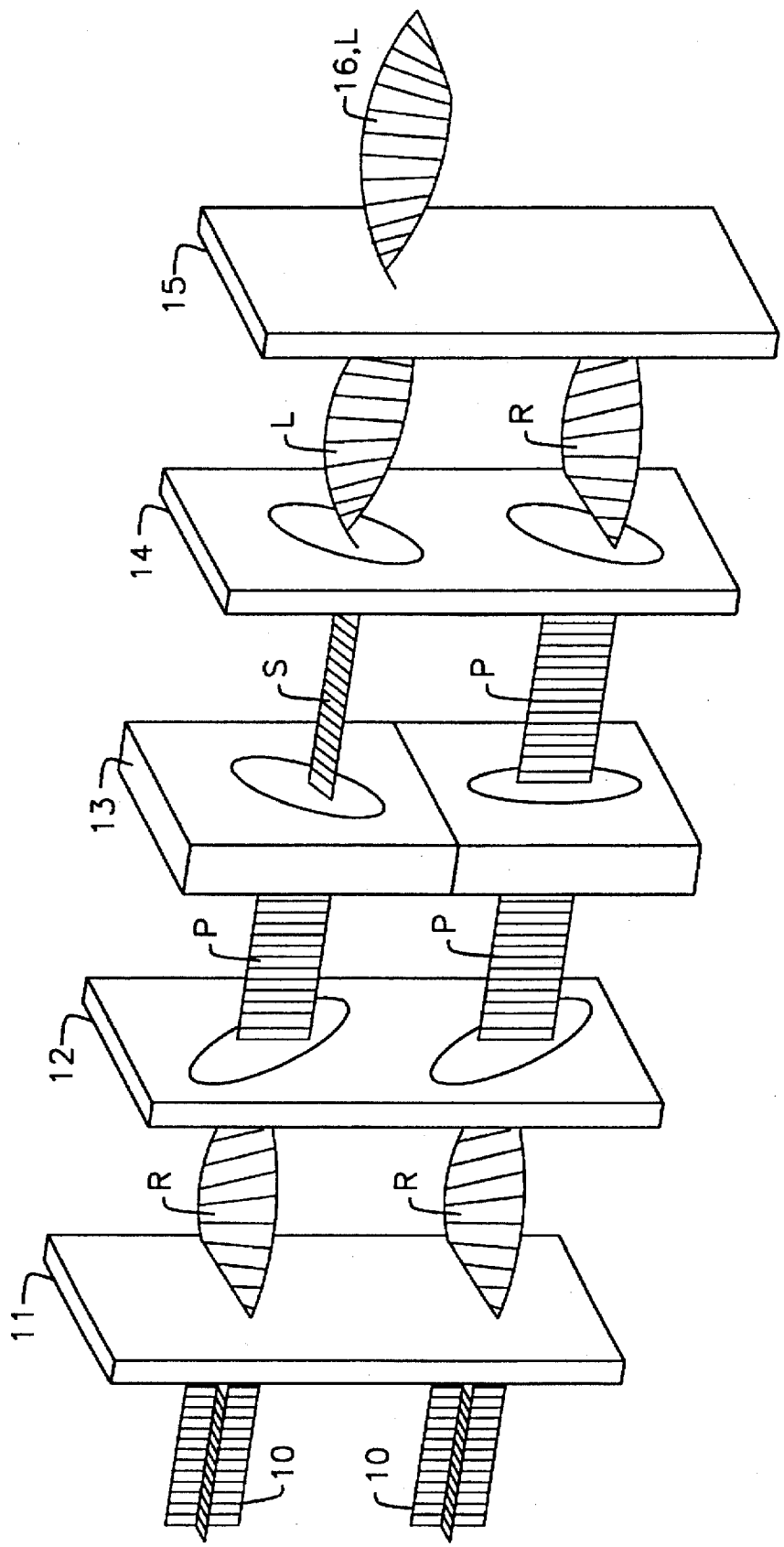
FIG. 2 shows a detail of a switchable band-block filter (SBBF)

FIG. 2 shows the construction of an SBBF. The drawing shows three possible switching states, completely dark (lower half of the drawing) and completely bright (upper half). Other control voltages on the liquid crystal cell 13 give intermediate colors as required. The SBBF comprises a cholesteric filter 11, λ/4 plates 12 and 14, a liquid crystal cell 13 and a cholesteric filter 15.

The construction of a cholesteric filter and possible monomeric and polymeric cholesteric liquid crystals is known for example from M. Schadt, et al., *Jpn. J. Appl. Phys.*,29.(10) :1974 ff (1990) or from R. Maurer, et al., SID Digest, pages 110–113 (1990). The most important property of cholesteric filters is that they reflect a circular polarization component of the incident light within a certain wavelength range (of the selective reflection band) and transmit all other light substantially without attenuation. Depending on the direction of rotation of the cholesteric liquid crystal, either the right or the left circular polarization is reflected (R or L filters respectively). Likewise, the position and width of the selective band can be chosen in known manner via the pitch and double refraction of the cholesteric liquid crystal.

FIG. 2 shows only the polarization state of the light within the selective band, there being no change in the polarization state of natural non-polarized light outside the selective band. Non-polarized light 10 within the selective band strikes the cholesteric L-filter 11. Only R-polarized light is transmitted, whereas L-polarization is reflected and can be used to increase the light efficiency according to EP-A-407 830. The transmitted R-light is converted by the λ/4 plate 12 into linear polarized light ("p" stands for polarized parallel to the vertical, "s" stands for polarized at right angles thereto). The liquid crystal cell 13 can polarize the light elliptically to a varying extent, the two illustrated limiting cases "p" and "s" being special cases thereof. The many possible kinds of liquid crystal cells which can serve this purpose are listed below. After the liquid crystal cell 13, the light strikes another λ/4 plate 14 and a cholesteric R-filter 15.

In the upper path of the rays the liquid crystal cell 13 rotates the p-polarization through 90° to s. In the drawing this is indicated by a λ/2 plate tilted 45° to the vertical, or alternatively it could be a twisted nematic (TN) cell in polarization-conveying mode. The spolarization after the cell 13 is converted by the λ/4 plate 14 into L-circular polarized light which is transmitted without attenuation by the cholesteric R-filter 15. That is, the filter is in the bright state (16).

In the lower path of the rays the p-polarization is retained during transit through the liquid crystal cell 13. In the drawing this is indicated by the fact that one main axis of double refraction is parallel to the polarization. However, the same optical effect could be had from a homoeotropically oriented liquid crystal layer. After the cell 13 the light is converted by the λ/4 plate 14 into R-circular polarized light. This light cannot travel through the cholesteric R-filter 15. The lower of the two paths of rays therefore corresponds to the dark state of the filter. The intermediate states correspond to grey values or various color co-ordinates.

Consequently, the SBBF shown in FIG. 2 has exactly the property required from filters 6, 7 and 8 in FIG. 1. That is, it can fade out a wavelength range to a varying extent.

The non-transmitted light reflected by filter 15 must not be reflected back from any layers (for example electrode layers of the liquid crystal cell 13). This is particularly important in the dark state, otherwise contrast will be greatly reduced. Since, however, such reflections can never be completely avoided, care must be taken that this reflected light is so polarized that it cannot pass through the filter 15. That is the light is R-circular polarized. This is the purpose served by the λ/4 plate 14, since it re-converts the reflected R-light into linear polarized light before any reflections can occur at contacts. If these reflections still occur, for example at cell 13, they are still linear polarized and are again R-polarized on transit through the λ/4 plate 14. If the λ/4 plate 14 is left out, the R-light will be converted to L-light on reflection in 13 and can pass through the filter 15. The λ/4 plate 14 can therefore critical in obtaining high contrasts. A λ/4 plate is not present for example in the switchable color-filter arrangement by S. Sato and M. Wada (*IEEE Transactions on Electron Devices*, ED-21(2):171–172 (February 1974).

In contrast to sequential actuation, no requirements are made on the polarization properties of the light transmitted by the SBBF, since its intensity is the only important factor. Consequently, a SBBF can be built up of identical cholesteric filters 11 and 15. Interchange between light and darkness occurs depending on the chosen orientation of the elements 12–14. It will be clear to a person skilled in the art that there are number of possible orientations of the liquid crystal cell 13 and the λ/4 plates 12 and 14, having substantially the same properties as the embodiment in FIG. 2.

The characteristic optical properties of cholesteric filters (sharp filter edges, purely dielectric effect without absorption) result in bright, photostable displays with excellent color saturation. This is in contrast to displays based on dichroic dyes (see for example EP-A-509 727, corresponding to U.S. Pat. No. 4,843,381, the contents of which are herein incorporated by reference), which have weaker color saturation and, owing to their absorption, are also less photostable.

A number of liquid-crystal cells are suitable as electro-optical cells 13. They must meet the condition that (1) they can convert a given linear polarization (p in FIG. 2) into elliptic polarization to a varying extent (depending on the applied voltage) two limiting values being included for optical contrast, that is 1) no change in polarization, and (2) rotation of polarization through 90°. In addition it must be possible to modulate all desired picture elements (in the extreme case a two-dimensional matrix containing several million pixels) by suitable methods at the desired picture rate. Modulation can be brought about by direct actuation or by multiplexing (including active addressed multiplexing) or by means of an active matrix. The following are examples of these liquid crystal displays (LCDs): TN-LCDs, STN-LCDs, ECB-LCDs, DAP-LCDSs, OMI-LCDs, polymer-dispersed LCDs or cells or DHF-LCDs or other ferroelectric LCDs capable of generating grey values (e.g. charge-controlled SSF-LCDs, SBF-LCDs or anti-ferroelectric LCDs). The choice of LCD on liquid crystal cell is readily determinable by the skilled artisan having read the present specification. The term "liquid crystal cell" as used in the art includes LCDs and other non-display cells, such as filters, retarders, and the like.

For clarity, the above abbreviations which are common in the liquid crystal art have the following meanings:

TN=twisted nematic (also known as the Schadt-Helfrich effect)

STN=supertwisted nematic

ECB=electrically controlled birefringence

DAP=Deformation aufgerichteter Phasen (German for: deformation of homogeneously-aligned phases)

OMI=optical mode interference

DHF=deformed helix ferroelectric

SSF=surface stabilized ferroelectric

SBF=short-pitch bistable ferroelectric

Figure 3:
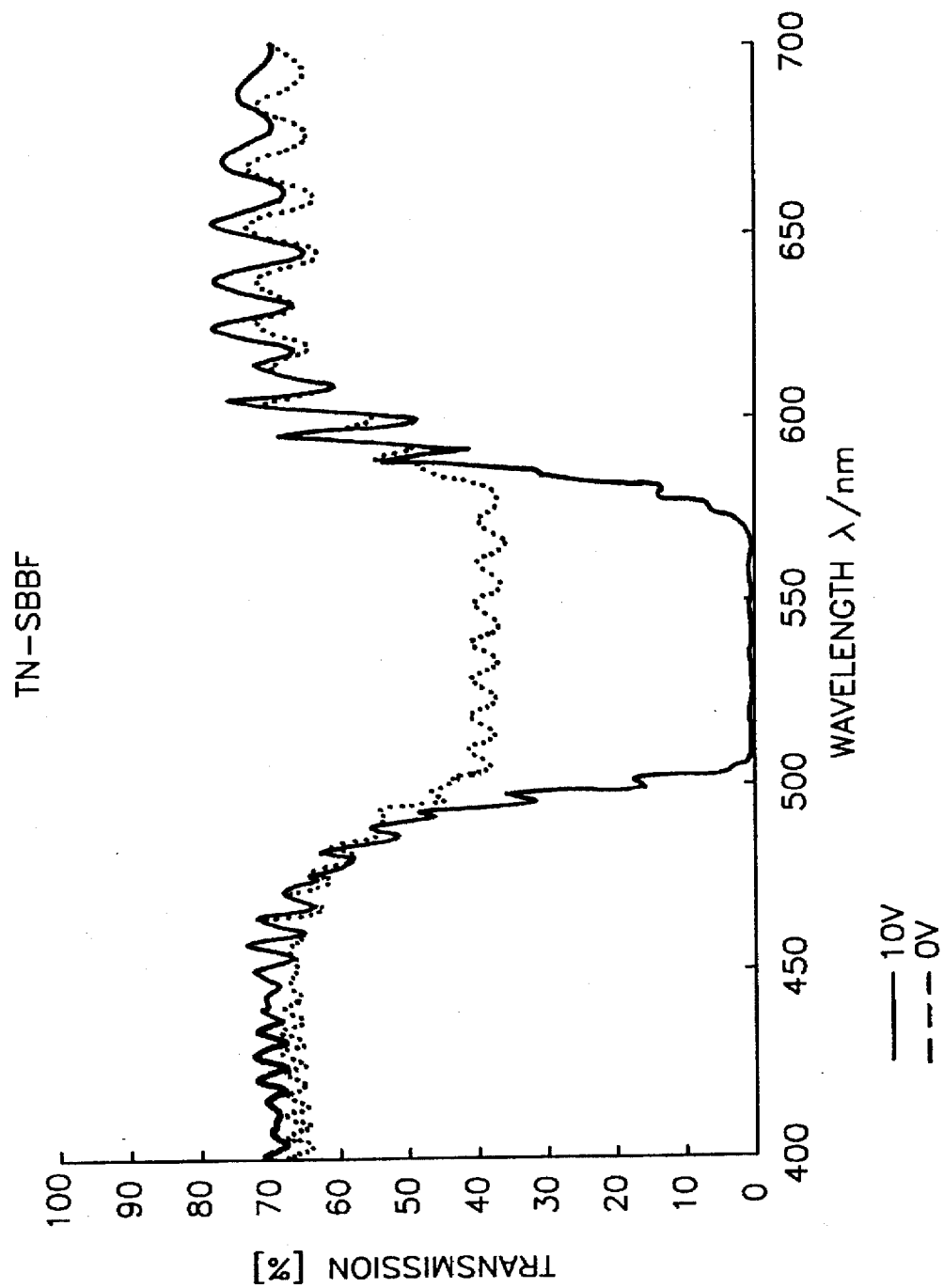
FIG. 3 shows measurements of transmission through a SBBF.

FIG. 3 shows the transmission spectrum of a SBBF according to FIG. 2 for non-polarized light. The cholesteric filters 12 and 14 each comprise two ground glass plates coated with polyimide at a spacing of 8 pm with a cholesteric liquid crystal mixture in between, with suitable double refraction and pitch of the cholesteric helix. The construction of such cells is known e.g. from M. Schadt, et al., *Jpn. J. Appl. Phys.*,29(10):1974 ff (1990). The liquid crystal cell 13 is a conventional TN cell. The $\lambda/4$ plates are commercial retarder films with a pitch difference of 140 nm. All the components are stuck with optical adhesive. FIG. 3 shows the transmission spectrum in the bright state (0 V on the cell) and in the dark state (10 Vpp, 1 kHz square wave at the cell). The good contrast and the sharp filter characteristic are clearly visible.

The main applications of the invention are to (1) very compact, highly informative liquid crystal projection displays, e.g. for high-definition TV projectors (version with microlenses), or (2) displays with larger pixels or other picture elements (without microlenses), where the brightness and color quality achieved by the present invention result in important improvements. In neither case are demands made on the liquid crystal cells other than those already made on commercial displays today. This contrasts markedly with sequentially actuated displays, where the speed of modern displays is still inadequate. Direct vision displays based on the invention are also possible (omitting the projection lens 9 in FIG. 1), but the angle-of-vision range may be somewhat restricted by the characteristic dependence of selective reflection on the angle.

Upon reading the present specification, various alternative embodiments will become obvious to the skilled artisan, such as with respect to the construction and placement of lenses. These variations are to be considered within the scope and spirit of the subject invention which is only to be limited by the claims which follow and their equivalents.

What is claimed is:

1. An electrically controllable color display device having compact linear light guidance, which comprises three switchable color filters optically connected in series, each color filter comprising two cholesteric filters, two $\lambda/4$ plates, and one electrically switchable liquid crystal cell with segmented electrodes, each color filter being constructed so as to attenuate one of three different colors in response to electrical control.

2. The display device according to claim 1, wherein a matrix is disposed in front of each filter, the matrix comprising a lens selected from the group consisting of microlenses, holographic lenses, Fresnel lenses, and graded index lenses.

3. The display device according to claim 1, wherein the liquid crystal cells in the color filters are selected from the group consisting of TN-LCD, STN-LCD, ECB-LCD, DAP-LCD, OMI-LCD, polymer-dispersed LCD, polymer dispersed cells, DHF cells, and other ferroelectric cells capable of generating grey values.

4. The display device according to claim 3, wherein the color filter is a ferroelectric cell capable of generating grey values, selected from the group consisting of charge-controlled SSF-LCDs, SBF-LCDs, and anti-ferroelectric LCDs.

5. The display device according to claim 2, wherein the liquid crystal cells in the color filters are selected from the group consisting of TN-LCD, STN-LCD, ECB-LCD, DAP-LCD, OMI-LCD, polymer-dispersed LCD, polymer dispersed cells, DHF cells, and other ferroelectric cells capable of generating grey values.

6. The display device according to claim 5, wherein the color filter is a ferroelectric cell capable of generating grey values, selected from the group consisting of charge-controlled SSF-LCDs, SBF-LCDs, and anti-ferroelectric LCDs.

7. The display device according to claim 1, wherein the display device is a projection display device.

8. The display device according to claim 1, wherein the display device is a projection attachment for a light-room projector.

9. The display device according to claim 1, wherein the display device is a direct vision display device.

10. An electrically controllable color display which comprises three switchable color filters optically connected in series, each filter comprising in order a first cholesteric filter, a first $\lambda/4$ plate, a liquid crystal cell, a second $\lambda/4$ plate, and a second cholesteric filter, each color filter being constructed so as to attenuate one of the three different colors in response to electrical control.

11. The display device according to claim 10, wherein the three different colors are red, green, and blue.

12. The display device according to claim 10, wherein first cholesteric filter is an L-filter which in the presence of a light source transmits R-light from the light source to the first $\lambda/4$ plate which converts the R-light into p-light which is then transmitted to the liquid crystal cell which either polarizes the p-light to s-light or allows the p-light to remain as p-light, the s-light or p-light is then transmitted to the second $\lambda/4$ plate which converts the s-light or p-light, respectively, to L-light or R-light, which is then transmitted to the second cholesteric filter which only allows L-light to be further transmitted.

* * * * *